INVENTOR.
H. J. HEPP

March 12, 1968

H. J. HEPP 3,373,220

ETHYLENE PRODUCTION

Filed Aug. 3, 1964

INVENTOR.
H. J. HEPP
BY *Young & Quigg*
ATTORNEYS

INVENTOR.
H.J. HEPP

March 12, 1968  H. J. HEPP  3,373,220
ETHYLENE PRODUCTION
Filed Aug. 3, 1964  4 Sheets-Sheet 4

INVENTOR.
H. J. HEPP
BY Young & Quigg
ATTORNEYS

United States Patent Office 3,373,220
Patented Mar. 12, 1968

3,373,220
ETHYLENE PRODUCTION
Harold J. Hepp, Bartlesville, Okla., assignor to Phillips Petroleum Company, a corporation of Delaware
Filed Aug. 3, 1964, Ser. No. 386,868
6 Claims. (Cl. 260—683)

ABSTRACT OF THE DISCLOSURE

Propane is converted to methane and ethylene by thermal hydrogenolysis followed by cracking, with recycle of hydrogen and heavy products of the thermal cracking to the hydrogenolysis.

---

This invention relates to the production of ethylene. In one aspect, it relates to the conversion of propane substantially completely to methane and ethylene by hydrogenolysis followed by thermal cracking, with recycle of all products except ethylene and methane. In another aspect the invention relates to apparatus for the production of ethylene from propane.

In the manufacture of ethylene by high temperature cracking of propane, numerous by-products such as propylene, butylenes, butadiene, and heavier products, are produced. For profitable operation, it is necessary to find markets for these products. Since the products usually must be produced with considerable degree of purity for sale, such sale entails installation of separation and purification equipment resulting in a considerable increase in capital investment and operating costs. In the process of this invention, the sole by-product is methane and the ultimate yield of ethylene is about a third greater than obtained by conventional cracking methods. Thus, expensive separation and purification steps are avoided, capital costs are reduced, and a single, easily marketed by-product is made.

According to my invention, propane is converted to ethylene in high yield by subjecting the propane to hydrogenolysis to produce ethane, cracking the ethane to produce ethylene, and recycling all of the by-product except methane to the appropriate step of the process. The process is substantially self-contained, normally requiring only the addition of relatively small quantities of hydrogen.

Further according to my invention, ethylene is produced by feeding propane to a hydrogenolysis zone, separating the effluent of the hydrogenolysis zone to produce separate streams of the hydrogen, and methane and ethane and heavier, recycling the hydrogen to the hydrogenolysis step, cracking the ethane, separating the effluent of the cracking step and recycling hydrogen to the hydrogenolysis zone, ethane to the cracking zone, and heavier materials to the hydrogenolysis zone. Ethylene and methane are recovered as products of the process.

Further according to my invention a process to the combination of hydrogenolysis and thermal cracking is practiced utilizing a single methane separation step without recycling methane to either hydrogenolysis or cracking.

Further, according to my invention there is provided apparatus for a process combining the steps of hydrogenolysis and thermal cracking to produce ethylene from propane.

Further according to my invention there are provided apparatus and process for combining the steps of hydrogenolysis and thermal cracking to produce ethylene from propane and wherein two separate methane separation processes are provided.

In the drawing, FIGURE 1 is a schematic illustration of apparatus suitable for a process combining the steps of hydrogenolysis and thermal cracking.

Figure 1:
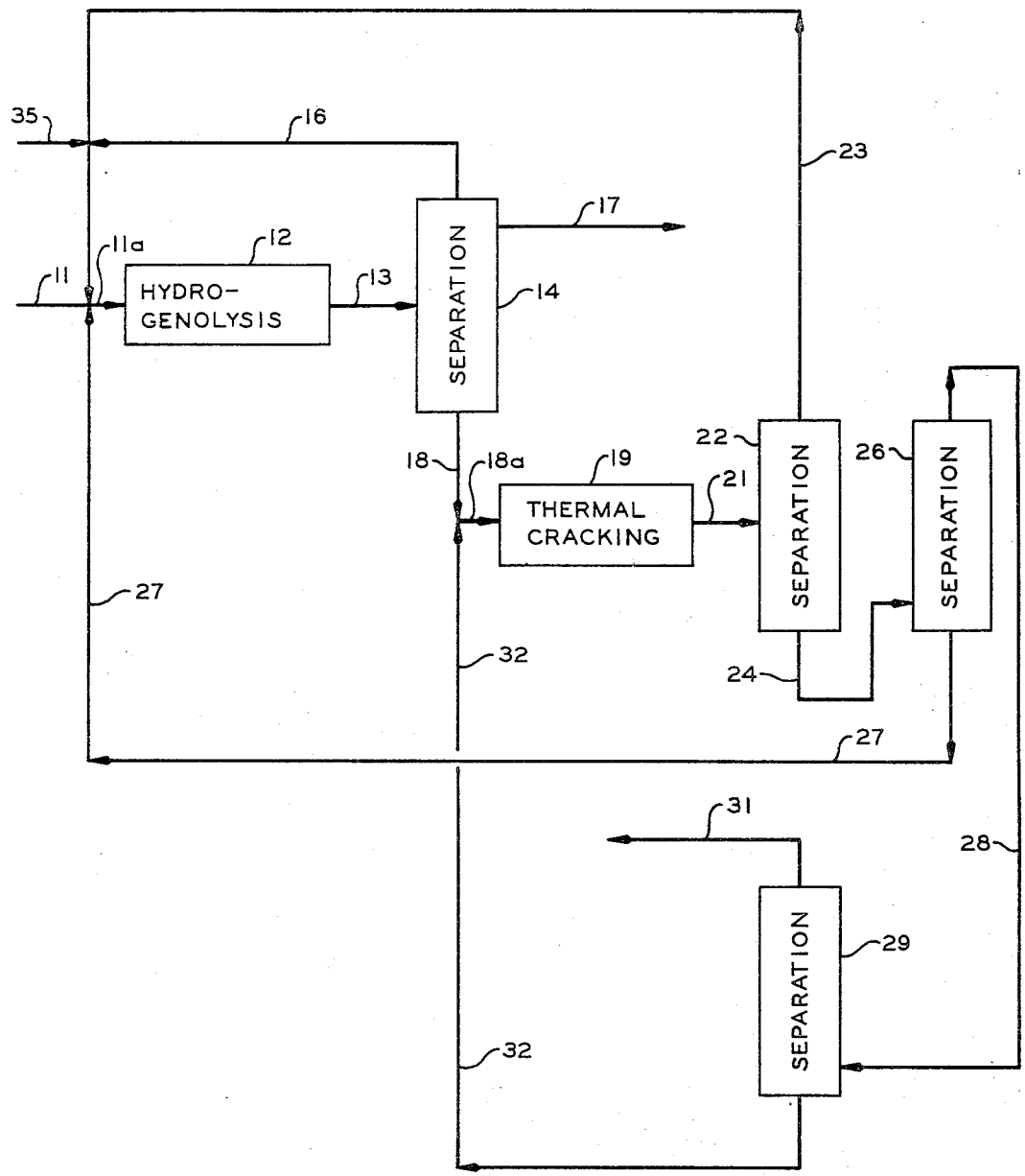

In FIGURE 1, a stream comprising propane is fed through conduit 11 into a hydrogenolysis reactor 12. The effluent from the hydrogenolysis reactor comprising hydrogen, methane, ethane and propane is removed through conduit 13 and fed to separation apparatus 14. From separation apparatus 14 a stream comprising substantially all of the hydrogen which was contained in the stream passing through conduit 13 is recycled through conduit 16. A stream comprising substantially all of the methane which was contained in the stream of conduit 13 is removed through conduit 17 while a stream comprising the heavier products from the stream of conduit 13 is removed through conduit 18 and fed to thermal cracking reactor 19.

In cracking reactor 19, ethane is converted to ethylene and propane to propylene. An effluent stream comprising hydrogen, methane, ethylene, ethane and propylene is removed through conduit 21 and passed through separation apparatus 22. From separation apparatus 22 a stream comprising substantially all of the hydrogen and methane contained in the stream in conduit 21 is removed through conduit 23 and recycled through hydrogenolysis reactor 12. The remainder of the components of the stream in conduit 21 are removed through conduit 24 and fed to separation apparatus 26. From separation apparatus 26, a stream is removed through conduit 27 comprising substantially all of that portion of the stream in conduit 21 which is heavier than ethane, and specifically includes propylene and propane. Another stream is removed from separation apparatus 26 through conduit 28 and comprises substantially all of the ethane and ethylene which was contained in the stream in conduit 21. The stream in conduit 28 is separated in separation apparatus 29 to produce an ethylene product stream in conduit 31 and an ethane recycle stream in conduit 32 which is returned to thermal cracking reactor 19.

Figure 2:
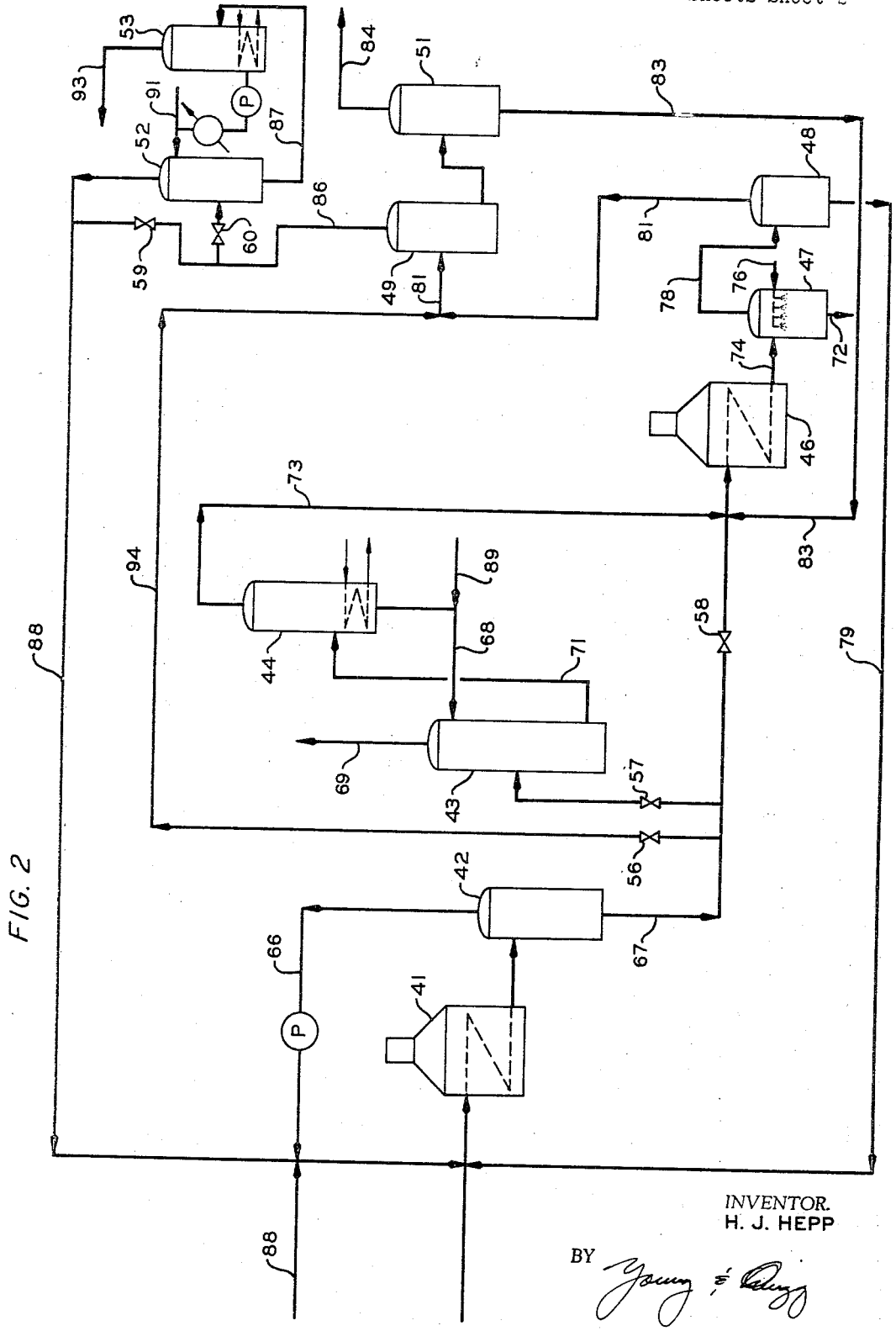
FIGURE 2 illustrates a system for combining hydrogenolysis and thermal cracking in a single process and illustrates in somewhat more detail, although still schematically, the various separation and recycle steps.

In the apparatus illustrated in FIGURE 2, there are combined a hydrogenolysis reactor 41, a fractional distillation column 42, an absorber 43, a stripper 44, a thermal cracking reactor 46, a quench tower 47, a fractional distillation column 48, a fractional distillation column 49, a fractional distillation column 51, an absorber 52 and stripper 53. Valves 56, 57 and 58, 59 and 60 are provided as shown.

In operation, with valves 56 and 58 closed and valve 57 open, a stream comprising propane is fed into hydrogenolysis reactor 41 wherein at least a portion of the propane is converted to ethane and methane. The effluent stream is fed into fractional distillation column 42 wherein a stream comprising substantially all of the hydrogen present in the effluent is removed through conduit 66 and recycled to hydrogenolysis reactor 41. The bottoms product from column 42 is fed through conduit 67 and valve 57 into absorber 43. Lean oil is fed from stripper 44 through conduit 68 into absorber 43. Methane is removed through conduit 69 and a rich oil, containing the heavier components of the stream, is returned through conduit 71 to stripper 44. These products are separated from the absorber oil in stripper 44 and passed through conduit 73 into thermal cracking reactor 46. The effluent from reactor 46, comprising ethylene, propylene, hydrogen and methane, is passed through conduit 74 to quench tower 47. Quench fluid is added through conduit 76 and removed through conduit 72. The cooled stream is fed through conduit 78 into a fractional distillation column 48. The bottoms product, comprising propylene and heavier, is recycled through conduit 79 to hydrogenolysis unit 41, while the overhead, comprising lighter products including ethylene, methane, and ethane, is passed through conduit 81 into a fractional distillation column 49. The bottoms product from column 49, comprising ethylene and ethane, is passed into a fractional distillation column 51 wherein the bottoms product, comprising ethane, is recycled through conduit 83 to cracking reactor 46 while the overhead, comprising ethylene, is removed as a product through conduit 84. The overhead from column 49 comprising methane and hydrogen is removed through conduit 86 and, with valve 59 closed and valve 60 open, is passed into absorber 52. In absorber 52 methane is removed with the rich oils through conduit 87 while hydrogen is recycled through conduit 88 to hydrogenolysis reactor 41. Any excess hydrogen needed is supplied through conduit 88 while additional absorber oil is supplied through conduit 89 for absorber 44 and through conduit 91 for absorber 52. Methane is separated from the absorber oil in stripper 53. In the system just described, methane is removed from the system both from absorber 43 and from stripper 53, through conduits 69 and 93, and therefore no methane is recycled to hydrogenolysis reactor 41 or thermal cracking reactor 46.

In another embodiment of my invention, valves 56 and 60 are open and valves 57, 58 and 59 are closed. The bottoms product from fractional distillation column 42 is passed through valve 56 and conduit 94 into the overhead from the effluent from fractional distillation column 48. This stream continues through column 49, wherein methane is removed prior to the material passing through conduit 83 into cracking reactor 46. Therefore, methane is removed from the stream passing to cracking reactor 46 and from the stream being recycled through hydrogenolysis reactor 41 with a single absorber.

If desired, this system can be operated with valves 56, 57 and 59 closed and valves 58 and 60 open. In this way, methane resulting from the hydrogenolysis reaction or contained in the original feed stream, is passed through cracking reactor 46 but build-up of methane in the system is prevented by removal in absorber 52. When the system is operated with valves 56 and 58 closed and valve 57 open, thus utilizing the demethanizing absorber 43, if desired valve 59 can be opened and valve 60 closed, thus utilizing only the single methane removal unit.

Figure 3:
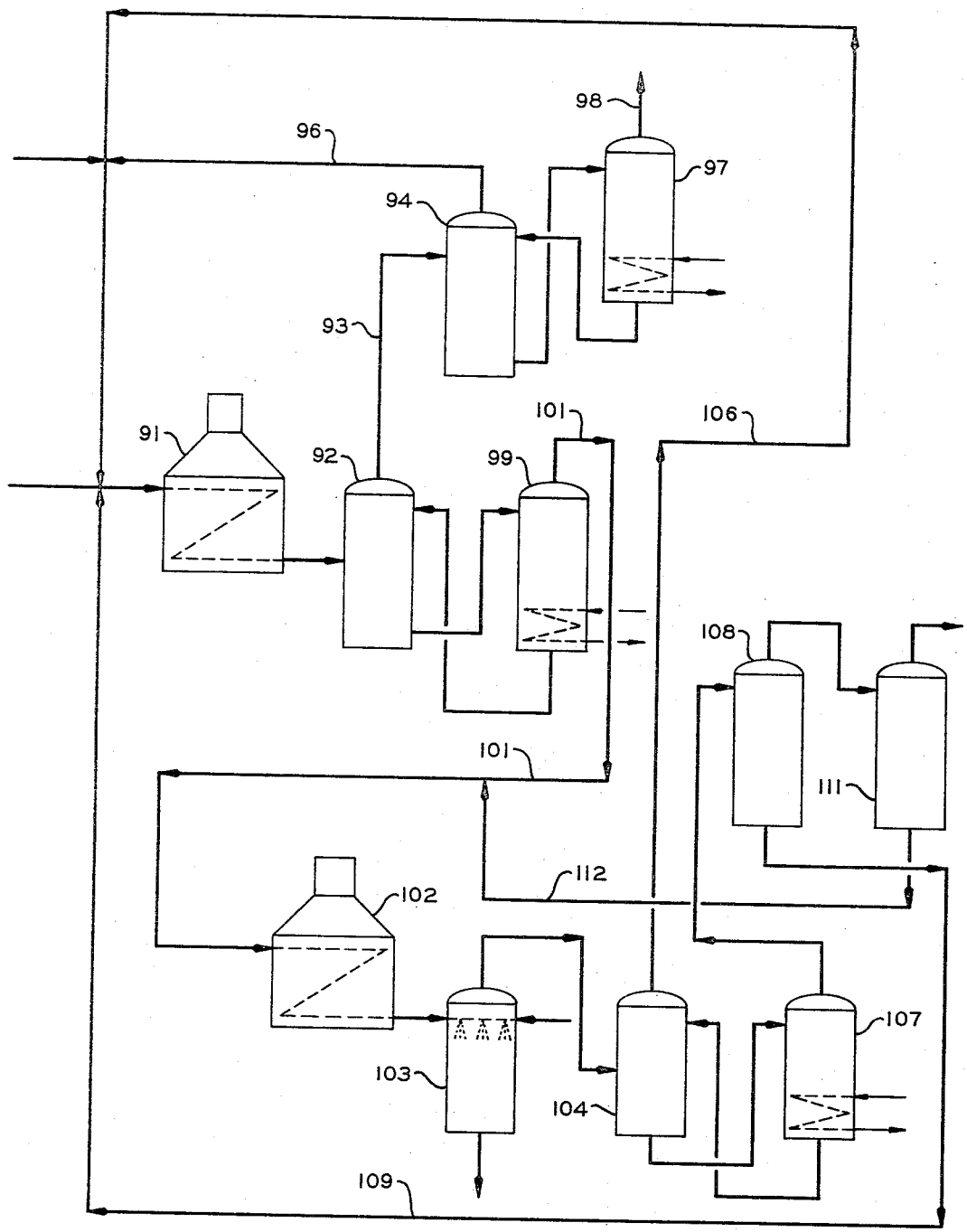
FIGURE 3 illustrates a system for combined hydrogenolysis and thermal cracking in a single process wherein a single methane removal step is provided between the hydrogenolysis and cracking steps.

In the system illustrated in FIGURE 3 a stream comprising propane is fed into hydrogenolysis reactor 91 wherein at least a portion of the propane is converted to ethane and methane. The effluent stream is fed into absorber 92 wherein a stream comprising substantially all of the hydrogen and methane in the effluent is removed through conduit 93 to absorber 94. In absorber 94 a stream comprising substantially all of the hydrogen is removed as a raffinate through line 96 and recycled to hydrogenolysis reactor 91. The rich oil stream from absorber 94 is separated in stripper 97 resulting in a stream comprising substantially all of the methane which is removed through conduit 98 and a lean oil which is returned to absorber 94. The rich oil from absorber 92 is passed to stripper 99 and the absorbed hydrocarbons removed through conduit 101 and fed into thermocracking reactor 102. The effluent from cracking reactor 102, following quench in quench 103, is fed to absorber 104 from which a stream comprising substantially all of the hydrogen and methane in the stream at this point is removed through conduit 106 and recycled to hydrogenolysis reactor 91. The stream at this point normally contains a small amount of methane. The absorbed hydrocarbons from absorber 104 are removed from the absorber oil in stripper 107 and passed into a distillation column 108 from which the stream comprising propylene and heavier is recycled through conduit 109 to hydrogenolysis reactor 91. The overhead from distillation column 108 is passed into distillation column 111 from which is removed an overhead stream comprising substantially all of the ethylene and a bottoms product comprising ethane which is recycled through conduit 112 to cracking reactor 102.

Figure 4:
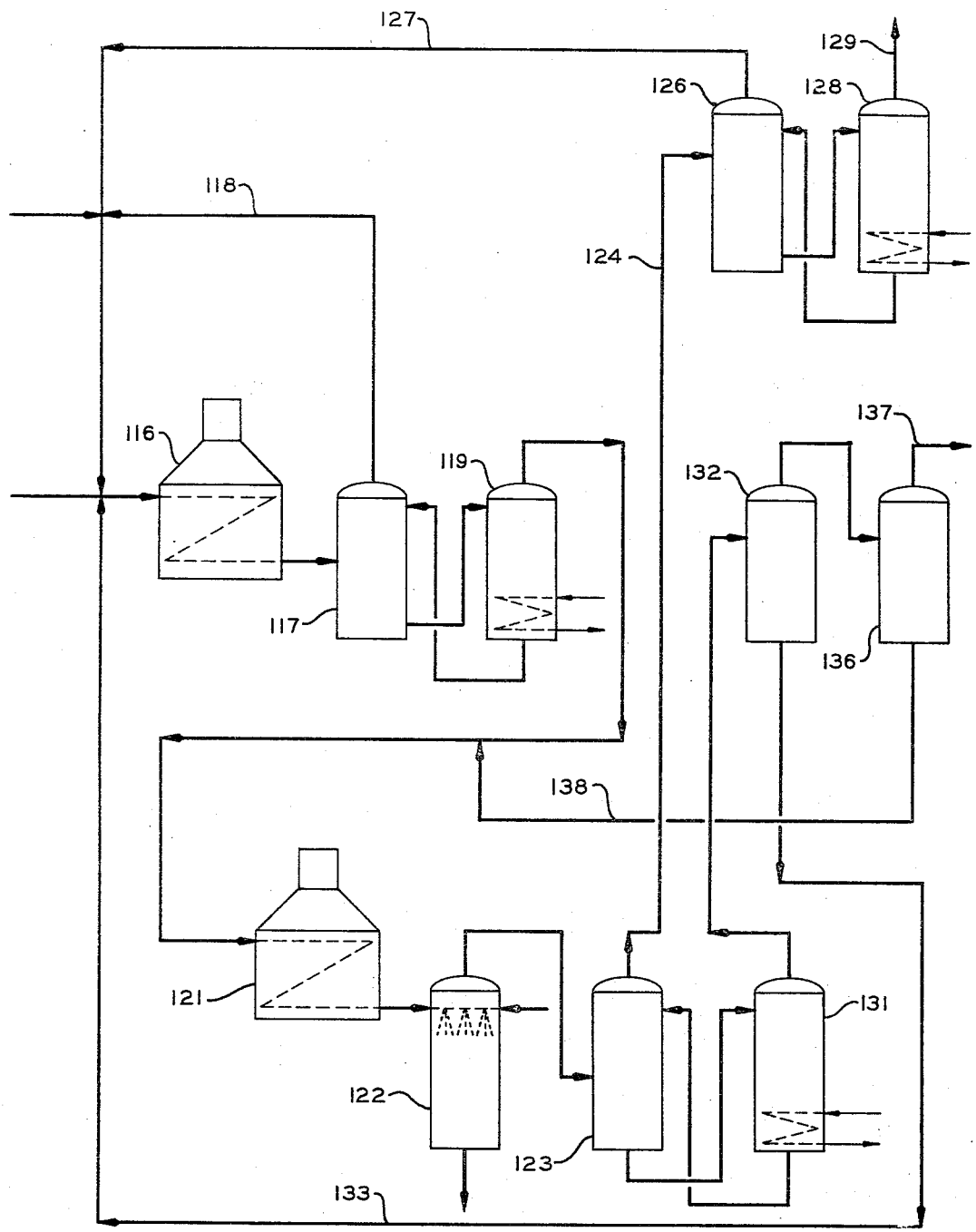
FIGURE 4 illustrates a system for combined hydrogenolysis and thermal cracking in a single process wherein a single methane removal step is provided following the cracking step.

In the system of FIGURE 4, a feed comprising propane is fed into hydrogenolysis reactor 116 and a stream comprising ethane and methane along with other produced products is fed into absorber 117. The raffinate of absorber 117 comprises substantially all of the hydrogen and methane in the stream and these products are recycled through conduit 118 to hydrogenolysis reactor 116. The absorbed hydrocarbons are removed in stripper 119 and fed into cracking reactor 121. The effluent from cracking reactor 121, following quench in quench 122, is fed to absorber 123. The raffinate from absorber 123, comprising substantially all of the hydrogen and methane in the stream at this point, is fed through conduit 124 into absorber 126. The raffinate from absorber 126, comprising substantially all of the hydrogen is recycled through conduit 127 to hydrogenolysis reactor 116. The absorbed methane is removed as a product from stripper 128 through conduit 129. The rich oil from absorber 123 is stripped in stripper 131 and the $C_2$ and heavier hydrocarbons are passed into distillation column 132 wherein a bottoms product comprising propylene and heavier is recycled through conduit 133 to hydrogenolysis reactor 116, while the overhead comprising ethylene and ethane is fed into distillation column 136 from which ethylene is removed as a product overhead through conduit 137 and ethane is recycled to cracking reactor 121 through conduit 138.

Through the use of the separation systems illustrated in FIGURE 3 and FIGURE 4, normally a saving can be effected with respect to the separation systems illustrated in FIGURE 2 through a saving in refrigeration.

In an example according to my invention, the stream fed through conduit 11 of FIGURE 1 into hydrogenolysis reactor 12 is substantially all propane. The combined stream fed to reactor 12, including the recycle streams 23 and 27, comprises hydrogen, methane and propylene, propane and some heavier hydrocarbons. Hydrogenolysis reactor 12 is operated at a temperature of 1200° F. and a pressure of 1000 p.s.i.g. The effluent comprising hydrogen, methane, ethane and propane is fed to separator 14. Substantially all of the hydrogen is recycled through conduit 16 and substantially all of the methane is removed through conduit 17 while the ethane and propane are fed through conduit 18 to thermal cracking reactor 19, along with ethane recycled through conduit 32. Thermal cracking reactor 19 is operated at a temperature of 1525° F. and an outlet pressure of 10 p.s.i.g. The effluent stream removed through conduit 21 comprises hydrogen, methane, a small amount of acetylene, ethylene, ethane, propylene and some heavier hydrocarbons. Both the hydrogen and methane are recycled through conduit 23 while the remainder of the products are passed for further separation. The material balance for the materials in the operation of my invention according to FIGURE 1 are given in Table I below, wherein the numbers correspond with the numbers of the conduits in FIGURE 1. It is well known in the cracking art that the best ethylene yield obtainable in propane cracking is of the order of 40 weight percent. By one embodiment of my process a yield of 54 percent is obtained, with only on easily-marketable methane by-product stream to dispose of.

In the description of my invention, the combination of apparatus suitable for the practice of the invention and comprising several aspects of the invention, has been described with schematic illustrations and many items of equipment forming a part of the commercial plant have been omitted. Such items including, for example, pumps, valves, control equipment, coolers, heaters, etc., are well known and can be supplied without experimentation by one skilled in the art. Similarly, one skilled in the art can supply proper conditions for the various separation steps. For example, suitable pressure reduction means, such as a back-pressure valve, can be placed in line 67 of FIGURE 2 and at appropriate points in the apparatus of FIGURE 3 and FIGURE 4.

When it is desired to remove methane between hydrogenolysis zone 41 and the cracking reactor 46 of FIGURE 2 and following cracking reactor 46, the apparatus of FIGURE 2 is operated with valve 56 closed, valve 57 open, valve 58 closed, valve 59 closed and valve 60 open. In this way it is seen that methane is removed from the system at two points, from absorber 43 and stripper 53.

TABLE I

| Components | 11 | 11a | 13 | 16 | 17 | 18 | 18a | 21 | 23 | 24 | 28 | 27 | 31 | 32 | 35 |
|---|---|---|---|---|---|---|---|---|---|---|---|---|---|---|---|
| Hydrogen | 209.4 | (¹) | (¹) | | | | | 158.3 | 158.3 | | | | | | 51.1 |
| Methane | 289.7 | 1,906.0 | | 1,906.0 | | | | 289.7 | 289.7 | | | | | | |
| Acetylene | | | | | | | | | | 24.8 | 24.8 | | 24.8 | | |
| Ethylene | | | | | | | | 2,216.3 | | 2,216.3 | 2,316.3 | | 2,216.3 | | |
| Ethane | | | 2,638.2 | | | 2,638.2 | 4,674.2 | 2,036.0 | | 2,036.0 | 2,036.0 | | | 2,036.0 | |
| Propylene | | | 165.3 | | | | | 165.3 | | 165.3 | | 165.3 | | | |
| Propane | 4,096.0 | 4,096.0 | 352.1 | | | 352.1 | 352.1 | | | | | | | | |
| Heavier | 135.9 | | | | | | | 135.9 | | 135.9 | | 135.9 | | | |
| Total | 4,096.0 | 4,896.3 | 4,896.3 | (¹) | 1,996.0 | 2,990.3 | 5,026.3 | 5,026.3 | 448.0 | 4,578.3 | 4,277.1 | 301.2 | 2,241.1 | 2,036.0 | 51.1 |

¹ Variable internal hydrogen recycle stream; not included in total of stream 13.

The hydrogenolysis step can be carried out either catalytically or thermally by processes known in the art. For example, using thermal hydrogenolysis, temperatures in the range of 1000–1300° F., outlet pressures of 200–2000 p.s.i.g. are suitable and the mol ratio of hydrogen to hydrocarbon usually is in the range of 1–3 and the contact time is adjusted to react 85 percent of more of the propane feed. When using catalytic hydrogenolysis, well known catalysts for this purpose such as molybdena on alumina or cobalt molybdate on alumina can be used under suitable conditions for the catalysts selected.

Although the ethane cracking step can be carried out either thermally or catalytically, thermal cracking of ethane can be carried out under conditions wherein the efficiency, that is conversion to the desired product ethylene, is sufficiently high that the use of a catalyst is very little if any improvement. Therefore, ordinarily economics greatly favor a thermal process. When using thermal cracking, usually the temperature will be in the range 1450–1600° F. and the outlet pressure in the range of 0–15 p.s.i.g. The mol ratio of steam to hydrocarbons is in the range of 0.3–2 and the contact time is adjusted to give hydrogen, ethylene and ethane concentrations of 80–90 percent of thermodynamic equilibrium. If a catalytic process is preferred under the particular conditions of operation, well known catalysts such as silica-alumina can be used under appropriate conditions for the catalysts selected.

Reasonable variation and modification are possible within the scope of my invention which sets forth method and apparatus for converting propane to ethylene.

I claim:

1. A process for the production of ethylene in high yields, comprising the steps of:
   feeding a first stream comprising propane to a hydrogenolysis zone;
   in said hydrogenolysis zone converting propane to methane and ethane;
   removing a second stream from said hydrogenolysis zone comprising hydrogen, methane, ethane and propane;
   separating said second stream to produce a third stream comprising substantially all of said hydrogen of said second stream, a fourth stream comprising substantially all of said methane of said second stream, and a fifth stream comprising substantially all of said propane and ethane of said second stream, substantially all of said second stream being contained in said third, fourth and fifth streams;
   recycling said third stream to said hydrogenolysis zone;
   feeding said fifth stream to a thermal cracking zone;
   in said thermal cracking zone converting ethane to ethylene and propane to propylene;
   removing a sixth stream from said cracking zone comprising hydrogen, ethane, propylene and ethylene;
   separating said sixth stream to produce a seventh stream comprising substantially all of said hydrogen of said sixth stream, an eighth stream comprising substantially all of said ethane of said sixth stream, a ninth stream comprising substantially all of said propylene of said sixth stream, and a tenth stream comprising substantially all of said ethylene of said sixth stream, substantially all of said sixth stream being contained in said seventh, eighth, ninth and tenth streams;
   recycling said seventh and ninth streams to said hydrogenolysis zone; and
   recycling said eighth stream to said thermal cracking zone.

2. A process for the production of ethylene in high yields comprising the steps of:
   feeding a first stream comprising propane to a hydrogenolysis zone;
   in said hydrogenolysis zone converting propane to methane and ethane;
   removing a second stream from said hydrogenolysis zone comprising hydrogen, methane and ethane;
   separating said second stream to produce a third stream comprising substantially all of said hydrogen of said second stream, a fourth stream comprising substantially all of said methane of said second stream, and a fifth stream comprising substantially all of said ethane of said second stream;
   recycling said third stream to said hydrogenolysis zone;
   feeding said fifth stream to a thermal cracking zone;
   in said thermal cracking zone converting ethane to ethylene;
   removing a sixth stream from said cracking zone comprising hydrogen, ethane and ethylene;
   separating said sixth stream to produce a seventh stream comprising hydrogen of said sixth stream, an eighth stream comprising substantially all of said ethane of said sixth stream, and a ninth stream comprising substantially all of said ethylene of said sixth stream;
   recycling said seventh stream to said hydrogenolysis zone; and
   recycling said eighth stream to a thermal cracking zone.

3. A process for the production of ethylene in high yields, comprising the steps of:
   feeding a first stream comprising propane to a hydrogenolysis zone;
   in said hydrogenolysis zone converting propane to methane and ethane;
   removing a second stream from said hydrogenolysis zone comprising hydrogen, methane, ethane and propane;
   separating said second stream to produce a third stream comprising substantially all of said hydrogen of said second stream, a fourth stream comprising substantially all of said methane of said second stream, and a fifth stream comprising substantially all of said ethane and propane from said second stream;

recycling said third stream to said hydrogenolysis zone;
feeding said fifth stream to a thermal cracking zone;
in said thermal cracking zone, converting ethane to ethylene, and propane to propylene;
removing a sixth stream from said cracking zone comprising hydrogen, methane, ethane, propylene and ethylene;
separating said sixth stream to produce a seventh stream comprising substantially all of said hydrogen from said sixth stream, an eighth stream comprising substantially all of said ethane of said sixth stream, a ninth stream comprising substantially all of said propane of said sixth stream, a tenth stream comprising substantially all of said ethylene of said sixth stream, and an eleventh stream comprising substantially all of said methane of said sixth stream;
recycling said seventh and ninth streams to said hydrogenolysis zone; and
recycling said eighth stream to said thermal cracking zone.

4. A process for producing ethylene in high yields, comprising the steps of:
feeding a first stream comprising propane to a hydrogenolysis zone;
feeding a second stream comprising ethane produced in said hydrogenolysis zone to a thermal cracking zone;
removing a product stream of ethylene;
removing a by-product stream of methane; and
recycling all remaining products to the appropriate one of said hydrogenolysis zones and said thermal cracking zone, including recycle of hydrogen and products of the thermal cracking heavier than ethane to said hydrogenolysis zone.

5. A process for producing ethylene in high yields from propane, comprising the steps of:
feeding a first stream comprising propane to a hydrogenolysis zone;
in said hydrogenolysis zone converting propane to methane and ethane;
removing a second stream from said hydrogenolysis zone comprising hydrogen, methane, ethane and propane;
feeding said second stream into a first separation zone;
separating said second stream in said first separation zone to produce a third stream comprising substantially all of said hydrogen of said second stream and a fourth stream comprising substantially all of the remainder of said second stream;
recycling said third stream to said hydrogenolysis zone;
feeding a fifth stream to said thermal cracking zone;
in said thermal cracking zone converting ethane to ethylene;
removing the effluent stream from said cracking zone comprising hydrogen, ethane and ethylene;
feeding said fourth stream, together with a sixth stream comprising effluent from said thermal cracking zone into a second separation zone;
separating the combined fourth and sixth streams in said second separation zone to produce said fifth stream comprising ethane, a seventh stream comprising substantially all of said combined streams heavier than ethane, an eighth stream comprising substantially all the methane and lighter of said combined stream, and a ninth stream comprising substantially all of the ethylene of said combined streams;
separating said eighth stream to produce a tenth stream comprising substantially all of the hydrogen contained therein, and an eleventh stream comprising substantially all of the methane contained therein; and
recycling said seventh and tenth streams to said hydrogenolysis zone.

6. A process for the production of ethylene in high yields, comprising the steps of:
feeding a first stream comprising propane to a hydrogenolysis zone;
in said hydrogenolysis zone converting propane to methane and ethane;
removing a second stream from said hydrogenolysis zone comprising hydrogen, methane, ethane and propane;
separating said second stream to produce a third stream comprising substantially all of said hydrogen of said second stream, a fourth stream comprising substantially all of said methane of said second stream, and a fifth stream comprising substantially all of said propane and ethane of said second stream, substantially all of said second stream being contained in said third, fourth and fifth streams;
recycling said third stream to said hydrogenolysis zone;
feeding said fifth stream to a thermal cracking zone;
in said thermal cracking zone converting ethane to ethylene and propane to ethylene and propylene;
removing a sixth stream from said cracking zone comprising hydrogen, methane, ethane, propylene and ethylene;
separating said sixth stream to produce a seventh stream comprising substantially all of said hydrogen of said sixth stream, an eighth stream comprising substantially all of said ethane of said sixth stream, a ninth stream comprising substantially all of said propylene of said sixth stream, a tenth stream comprising substantially all of said ethylene of said sixth stream, and an eleventh stream comprising substantially all of said methane of said sixth stream, substantially all of said sixth stream being contained in said seventh, eighth, ninth, tenth and eleventh streams;
recycling said seventh and ninth streams to said hydrogenolysis zone; and
recycling said eighth stream to said thermal cracking zone.

References Cited

UNITED STATES PATENTS

| | | | |
|---|---|---|---|
| 2,387,309 | 10/1945 | Sweeney | 260—683 |
| 2,498,806 | 2/1950 | Hachmuth | 260—683 |
| 2,580,002 | 12/1951 | Carrier | 260—683 |

FOREIGN PATENTS

| | | |
|---|---|---|
| 846,679 | 8/1960 | Great Britain. |

DELBERT E. GANTZ, *Primary Examiner.*

C. E. SPRESSER, *Assistant Examiner.*